(12) United States Patent
Garimella et al.

(10) Patent No.: US 8,539,544 B2
(45) Date of Patent: Sep. 17, 2013

(54) METHOD OF OPTIMIZING POLICY CONFORMANCE CHECK FOR A DEVICE WITH A LARGE SET OF POSTURE ATTRIBUTE COMBINATIONS

(75) Inventors: Sandilya Garimella, San Jose, CA (US); John D. Bruner, South Barrington, IL (US); Venu M. Chukkapalli, Tenali, IN (US); Baba Srinivasan, Bangalore (IN)

(73) Assignee: Motorola Mobility LLC, Libertyville, IL (US)

( * ) Notice: Subject to any disclaimer, the term of this patent is extended or adjusted under 35 U.S.C. 154(b) by 959 days.

(21) Appl. No.: 12/129,745

(22) Filed: May 30, 2008

(65) Prior Publication Data

US 2009/0300707 A1    Dec. 3, 2009

(51) Int. Cl.
*H04L 9/32*     (2006.01)
*G06F 21/00*    (2013.01)

(52) U.S. Cl.
USPC ............ 726/1; 726/3; 726/4; 726/14; 726/22; 713/156

(58) Field of Classification Search
USPC ............................................................ 726/1
See application file for complete search history.

(56) References Cited

U.S. PATENT DOCUMENTS

| 7,010,683 | B2 * | 3/2006 | Corella ........................ 713/156 |
| 7,519,736 | B2 * | 4/2009 | Parham ........................ 709/244 |
| 8,104,073 | B2 * | 1/2012 | Hanna ............................ 726/4 |
| 2001/0032310 | A1 * | 10/2001 | Corella ........................ 713/156 |
| 2002/0069274 | A1 * | 6/2002 | Tindal et al. .................. 709/223 |
| 2003/0055994 | A1 * | 3/2003 | Herrmann et al. ........... 709/229 |
| 2005/0131997 | A1 * | 6/2005 | Lewis et al. .................. 709/203 |
| 2006/0085850 | A1 * | 4/2006 | Mayfield et al. ............... 726/14 |
| 2006/0168120 | A1 * | 7/2006 | Parham ........................ 709/218 |
| 2006/0218635 | A1 * | 9/2006 | Kramer et al. ................. 726/22 |
| 2007/0234040 | A1 | 10/2007 | Hurst et al. |
| 2007/0239748 | A1 * | 10/2007 | Smith ........................... 707/101 |
| 2007/0240197 | A1 * | 10/2007 | Blumenthal et al. ............ 726/1 |
| 2009/0300179 | A1 * | 12/2009 | Srinivasan .................... 709/225 |

OTHER PUBLICATIONS

PCT Search Report & Written Opinion, RE: Application #PCT/US09/45600 Jul. 14, 2009.

* cited by examiner

*Primary Examiner* — Kambiz Zand
*Assistant Examiner* — Yonas Bayou (57) ABSTRACT

A method, apparatus, and electronic device for conforming integrity of a client device 106 are disclosed. A memory 1100 may store a policy tag 404 associated with a subgroup of a group of policies 1102 and having a tag timestamp. A network interface 1060 may receive the certificate of health 300 from the client device 106. A processor 1010 may extract from the certificate of health a certificate timestamp 302 and a policy tag 304. The processor 1010 may access the tag timestamp. The processor 1010 may execute a comparison of the certificate timestamp 302 with the tag timestamp. The network interface 1060 may grant access to a network 104 based in part upon the comparison.

19 Claims, 12 Drawing Sheets

| Threshold Timestamp (THTS) 402 | | |
|---|---|---|
| Policy Tag 404 | Critical Timestamp (CTS) 406 | Non-Critical Timestamp (NTS) 408 |
| A | α | a |
| B | β | b |
| C | χ | c |
| D | δ | d |
| E | ε | e |

METHOD OF OPTIMIZING POLICY CONFORMANCE CHECK FOR A DEVICE WITH A LARGE SET OF POSTURE ATTRIBUTE COMBINATIONS

1. FIELD OF THE INVENTION

The present invention relates generally to the field of networks. The present invention further relates specifically to conforming the integrity of a client device in a network.

2. INTRODUCTION

Electronics devices such as personal computers, laptops, mobile phones, and personal digital assistants (PDAs) may be used to exchange data within a system. A system may comprise an internet protocol (IP) network and a non-internet protocol system portion (which could be a non-IP network). For example, the portion of a cellular telephone system that includes the telephones and cell site transceivers may be typically a non-IP portion of the system, whereas a gateway device in the system may be a bridge between an IP network of the system and a non-IP portion of the system. Further, other network devices may be wholly within an IP network that forms a fixed portion of the cellular telephone system. A network may be a local area network (LAN), a wide area network (WAN), a wireless local area network (WLAN), or a virtual local area network (VLAN). These may be typically IP networks. Unfortunately, the effective operation of a network and the devices attached to it may be threatened by cyber attacks. Some attacks may come directly in the form of hostile Internet traffic, while others may come in the form of "malware" such as viruses, spyware, rootkits, etc. In the past, defending a network at its perimeter was possible, but as the sophistication of the attacks has grown, the defense of a network need encompass not only the network infrastructure itself (routers, switches, load balances, etc.) but also the devices attached to it. This in turn may require that these devices implement particular security configurations and security software (such as anti-virus software). In addition, because security compromises often begin by exploiting known flaws in software, the software packages on these devices should be continually kept up to date. This required configuration may be expressed in a set of security policies for network devices. The electronic devices inside the network should comply with these policies to access the data or information stored in the network.

Furthermore, an electronic device, which is not an element of the network, may need to join the network. Such an electronic device may be known as a client device. In order to ensure safety and integrity of the network, a client device should be given access to the network only when the client device is compliant to the network security policy. In the event that the device is not compliant, the client device should not be given access until it has been remediated, or brought into compliance with policy. This process may be known as "network access control."

Several methods for network access control are known in the art. In one such method, the client device may report a set of integrity measurements that describe the current status of elements of the client device such as the software, data, and configuration parameters. The report may occur during an access attempt, such as when the device first connects to the network and the identity of the device and its user is established, or authenticated. If the device and user are not successfully authenticated, the device may be denied access to the network. If the device and user are successfully authenticated, the integrity measurements are examined, and the integrity measurements indicate compliance with the security policy, the device may be granted full network access. If the device and user are successfully authenticated but the integrity measurements indicate some variance from the network security policy, the device may be granted limited access so that the device may retrieve software patches and other configuration information to bring itself into compliance.

However, the method just described may be processor intensive and may be employed only on client devices having high bandwidth connections and reasonable tolerance to connectivity latency. Further, the collection of measurement data on the device typically may require that the client device contain some set of software components, or agents, that collect and report the measurement data. This approach may be suitable for devices such as laptops, personal computers, etc. which have large memories, fast processors, and high-bandwidth connections. However, this approach may not scale well to small devices, such as mobile phones, which exhibit more stringent constraints upon processor speed, memory, and communications bandwidth. Further, a fairly small number of variations may exist between types of PCs, laptops, etc., typically a few configurations for, e.g., Windows XP, Windows 2000, MacOS, Linux, etc. By contrast, mobile phones may have much greater diversity, with multiple manufacturers and multiple product lines per manufacturer.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an apparatus, and an electronic device, and other embodiments that relate to the basic concepts of the invention. The electronic device may be any manner of computer, mobile device, or wireless communication device.

A method, apparatus, and electronic device for conforming integrity of a client device are disclosed. An access server may organize a group of policies into sub-groups. The access server may associate each sub-group with a policy tag. The access server may associate each policy tag with a tag timestamp. The access server may extract from a certificate of health a certificate timestamp and a policy tag. The access server may execute a comparison of the certificate timestamp with the tag timestamp. The access server may receive the certificate of health from the client device. The access server may grant access to a network based in part upon the comparison.

The embodiments described herein include methods for network access control suitable for devices with the characteristics of mobile handsets. In particular, rather than the client sending a complete set of integrity measurements, these embodiments define a certificate of health, or trusted token, stored on the client, to bypass the need for communicating the complete set of measurements, wherein the certificate of health may verify that the client device had a qualified set of integrity measurements at a specific time. When seeking access to the network, rather than exchanging the entire set of integrity measurements, the client device may report this certificate of health. When the certificate of health is determined to be valid, the client device may be granted full access to the network. When the certificate of health is determined not to be valid, the client device may be granted only limited access. Further, in the case where the certificate of health is determined not to be valid, the client device may enter a remediation process. The network may identify those integrity measurements that establish a need for updating elements of the client's device, and the client device may pull the necessary updates (or the network may push them) and the client may update those elements.

Various embodiments of the present invention provide a method for a client device to have its integrity conformed. The client device may transmit a certificate of health during a network access attempt. The certificate of health may identify an integrity state of the client device. Further, the client device may enter a remediation process. The remediation process may include receiving a list of required integrity measurements, obtaining these measurements, transmitting those measurements, receiving a set of updates, processing these updates, receiving a new certificate of health, and storing the new certificate of health.

For an embodiment of the present invention, a method for a server to conform integrity of a client device is provided. The server may receive from a client device a certificate of health. The certificate of health may identify an integrity state of the client device. Further, the server may determine whether the integrity state of the client device is current. Furthermore, in the case in which the integrity state of the device is not current, the server may enter a remediation process. The remediation process may include requesting a subset of integrity measurements from the client device that are not current. Moreover, the remediation process may include determining a set of updates from the subset of integrity measurements. Furthermore, the remediation process may include pushing the set of updates to the client device. Finally, the remediation process may include sending a new certificate of health to the client device. The new certificate of health may identify the current integrity state of the client device.

Various embodiments of the present invention describe a client device. The client device may have a transceiver for receiving a certificate of health. The certificate of health may identify an integrity state of the client device. Further, the client device may have a memory module for storing the certificate of health. The transceiver may also transmit the certificate of health during a network access attempt.

Figure 1:
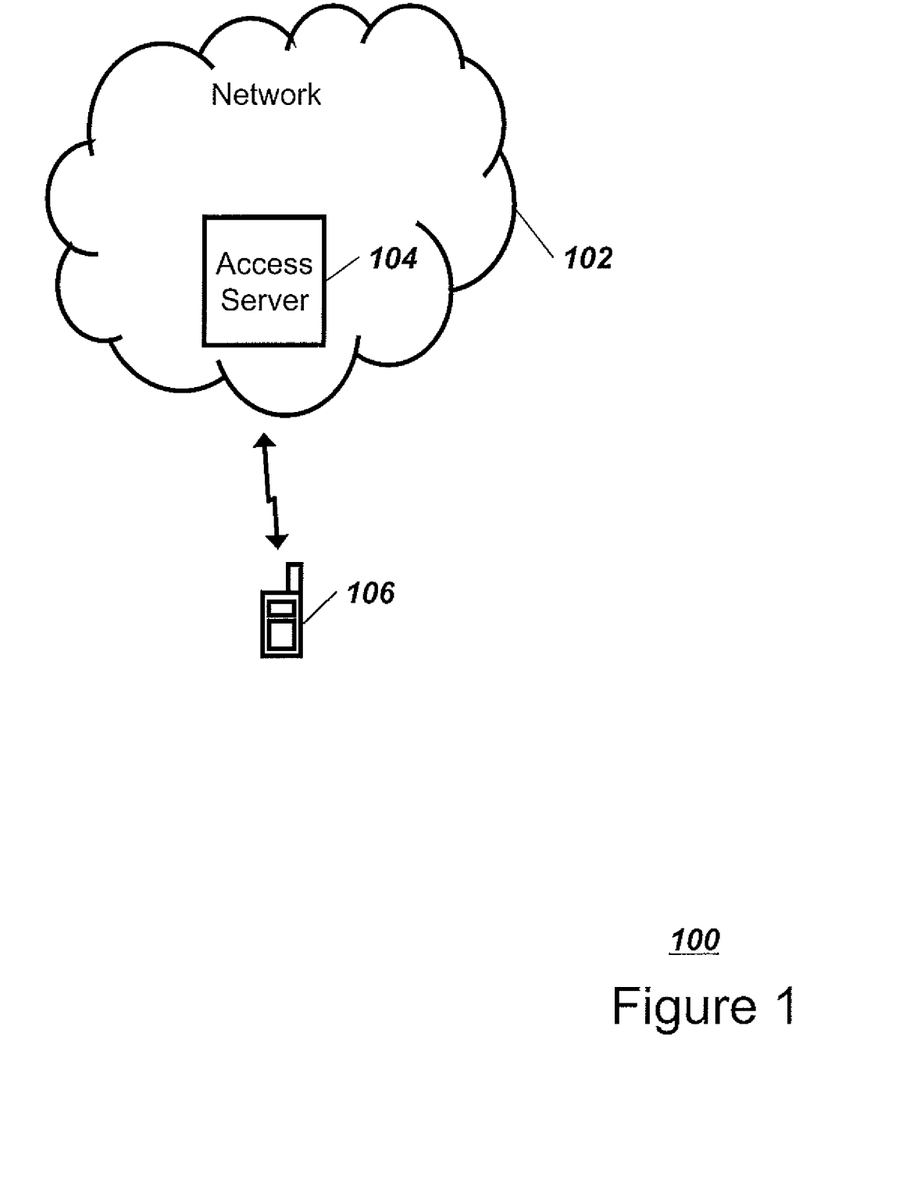
FIG. 1 illustrates one embodiment of a communication system.

FIG. 1 illustrates one embodiment of a communication system 100. The communication system 100 may include a network 102 and a client device 106. Further, the network 102 may include a network access server 104. Various communication devices may exchange data or information through the network 102. The network 102 may be an internet protocol (IP) network such as a local area network (LAN), a wide area network (WAN), a wireless local area network (WLAN), or it could be any other type of network. Further, a network administrator of the network 102 may implement various security policies on the network 102. Examples of such policies may include versions of software, versions of the data files, versions of antivirus software, configuration parameters, and so forth. These policies may ensure safety and integrity of data or information stored in the network 102. The network access server 104 may be capable of verifying compliance of the client device 106 with the security policies of the network 102, when the client device 106 tries to access the network 102. The network access server 104 may ensure that the identity and security policies of the client device 106 (and possibly also the identity of the person using the device) are verified before providing access to the network 102. For one embodiment, the network access server 104 may be a distributed set of servers in the network. The client device 106 may be one of several types of handheld devices, such as, a mobile phone, a laptop, or a personal digital assistant (PDA). For one embodiment, the client device 106 may be a WiFi® capable device, a WiMax® capable device, or other wireless devices. The wireless devices may transmit data using cellular packet data formats such as general packet radio service (GPRS), enhanced data rates for global evolution (EDGE), universal mobile telecommunications system (UMTS), evolution data optimized (EvDO) format, or other cellular packet data formats. In one embodiment, the client device 106 may connect to the network 102 via a wireline or virtual private network (VPN) access. The WiFi® capable device may be used to access the network 102 for data or by voice using voice over Internet protocol (VOIP).

Figure 2:
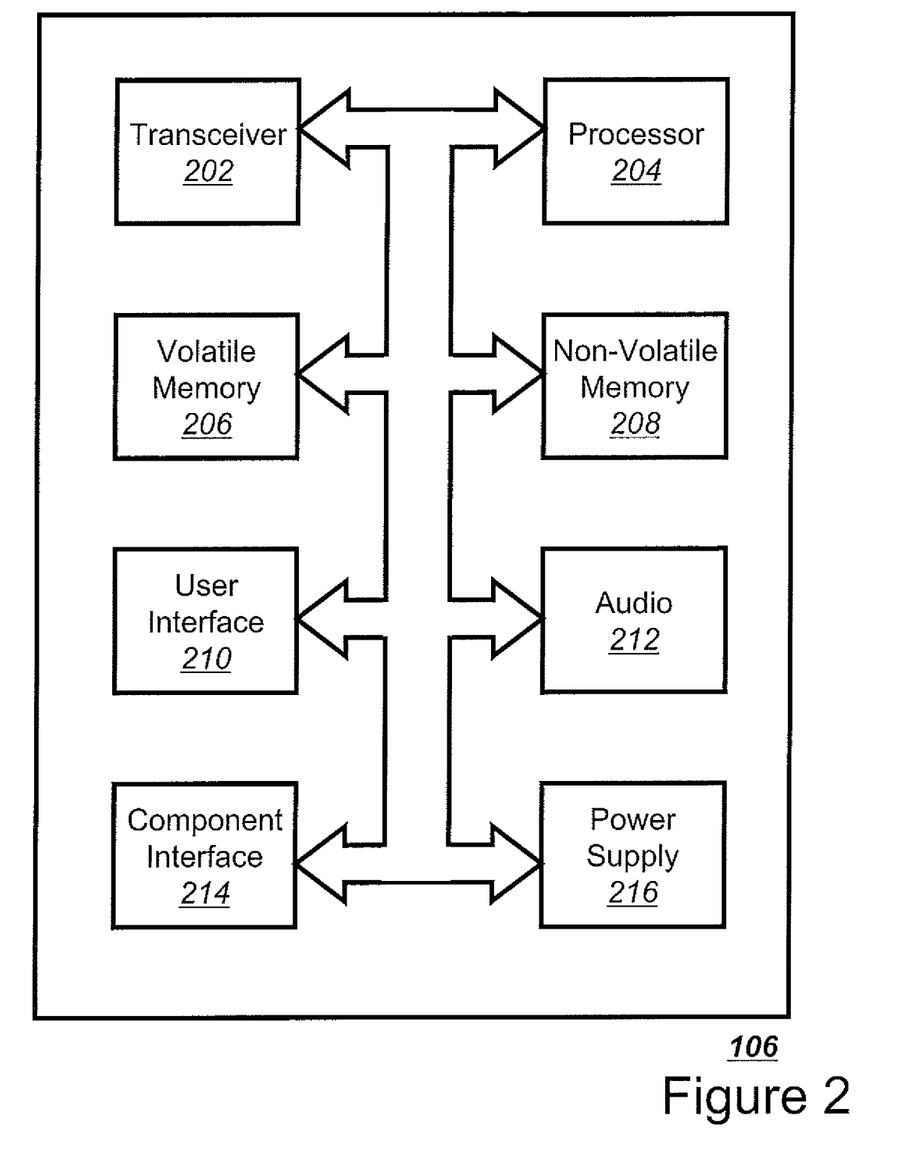
FIG. 2 illustrates in a block diagram one embodiment of the client device.

FIG. 2 illustrates in a block diagram one embodiment of the client device 106. The client device 106 may be capable of accessing the information or data stored in the network 102. For some embodiments of the present invention, the client device 106 may also support one or more applications for performing various communications with the network 102. The client device 106 may be a handheld device, such as, a mobile phone, a laptop, or a personal digital assistant (PDA). For some embodiments of the present invention, the client device 106 may be WiFi® capable device, which may be used to access the network 102 for data or by voice using VOIP. The client device 106 may be a wireless device and may receive or transmit a certificate of health wirelessly. The client device 106 may include a transceiver 202, which is capable of sending and receiving data over the network 102. The client device 106 may include a processor 204 that executes stored programs. The client device 106 may also include a volatile memory 206 and a non-volatile memory 208 which are used by the processor 204. The client device 106 may include a user input interface 210 that may comprise elements such as a keypad, display, touch screen, and the like. The client device 106 may also include a user output device that may comprise a display screen and an audio interface 212 that may comprise elements such as a microphone, earphone, and speaker. The client device 106 also may include a component interface 214 to which additional elements may be attached, for example, a universal serial bus (USB) interface. Finally, the client device 106 may include a power supply 216.

Figure 3:
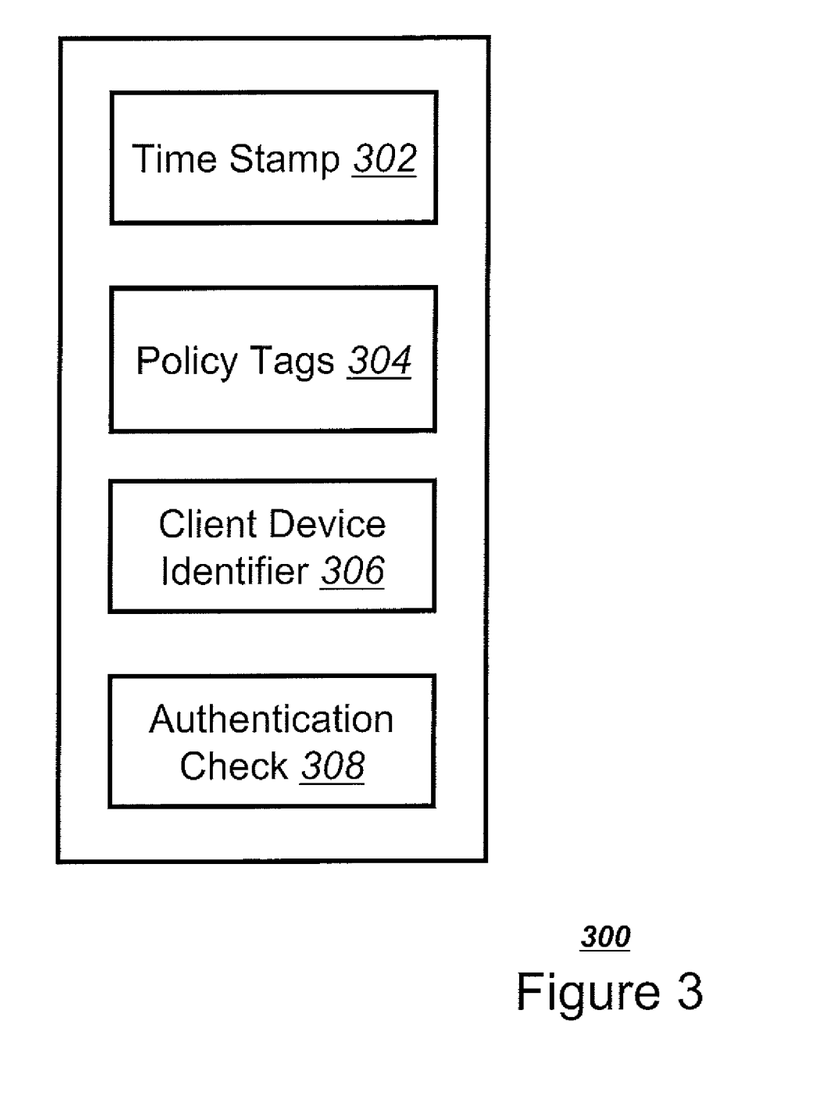
FIG. 3 illustrates in a block diagram one embodiment of a certificate of health, or trusted token, that may identify an integrity state of the client device.

FIG. 3 illustrates in a block diagram one embodiment of a certificate of health 300, or trusted token, that may identify an integrity state of the client device 106. The certificate of health 300 may be received by the transceiver 202. The integrity state may be a configuration of the client device 106 that may be altered by downloading information to the client device 106. A set of policies, or integrity measurements, may be used to determine the integrity state of the client device 106. The policies may include one or more identification parameters for identifying versions of software, versions of data files, configuration parameters, and blowable fuse settings. The certificate of health 300 may include a certificate timestamp 302 to identify the date of issuance of the certificate of health by the network. The certificate of health 300 may include a set of policy tags 304 corresponding to a sub-group of a group of policies. This set of policy tags 304 may include one or more combo-tags, a type of policy tag that represents a combination of policy tags.

The certificate of health 300 may include a client device identifier 306 to bind the certificate of health 300 to the mobile device, identifying the certificate of health as belonging to that device and that device alone. Further, the integrity of the certificate of health may be protected by encryption, for example, by using a signed cryptographic hash, or an authentication check 308. The non-volatile memory module 208 may store the certificate of health for later use when the client device 106 has to access the network 102. Further, when the client device 106 accesses the network 102, the transceiver 202 may transmit the certificate of health 300 to the access server 104.

Figure 4:
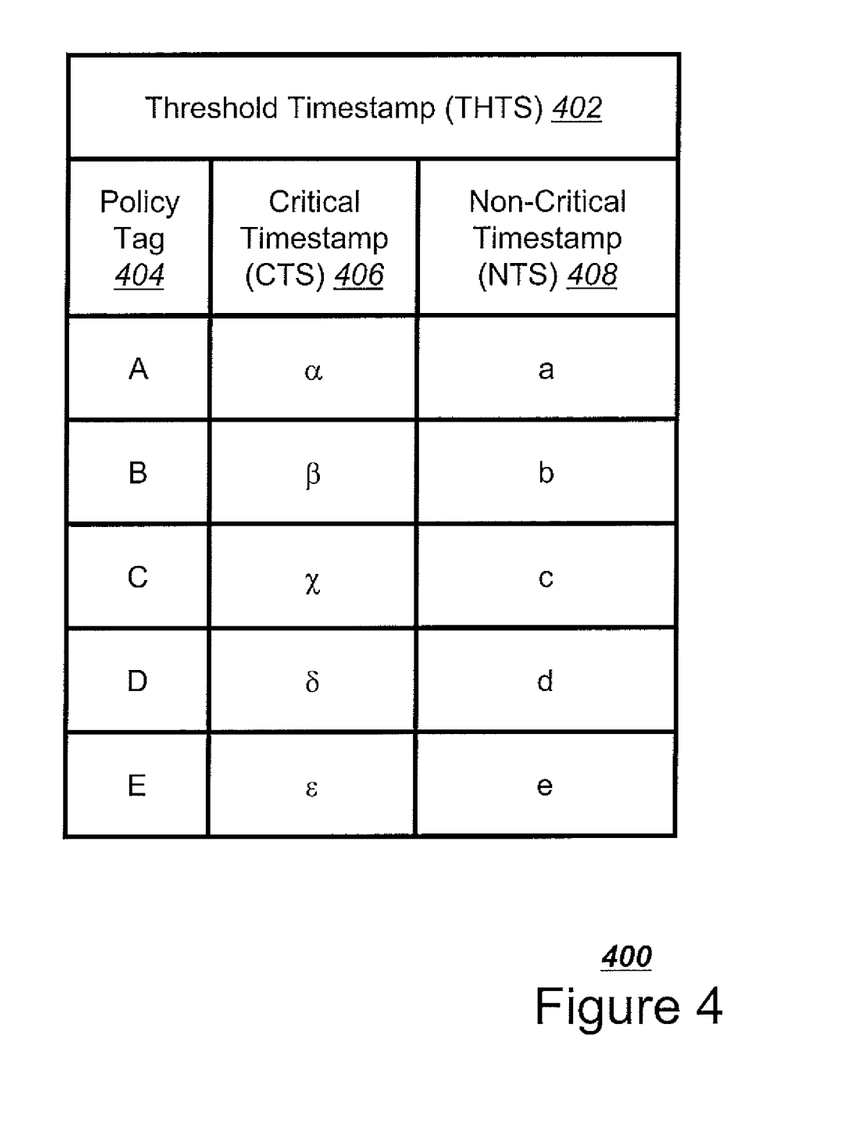
FIG. 4 illustrates in a block diagram one embodiment of a policy cache.

The access server 104 may use a group of policies to determine whether a certificate of health 300 represents a valid integrity state. FIG. 4 illustrates in a block diagram one embodiment of a policy cache 400 to store the group of policies. The policy cache 400 may have a threshold timestamp (THTS) 402. The THTS 402, when set, may be used to reset all the client devices 106 with a certificate of health timestamp 302 prior to the THTS 402.

The policy cache 400 may store a policy tag 404 that is associated with a subgroup of the group of policies. The policy tag 404 may represent a characteristic of a client device 106, such as client device brand (i.e. Motorola®, Nokia®, Samsung®), network provider (i.e. Verizon®, Sprint®, AT&T®), hardware platform, operating system, role of the user, or other characteristics. The subgroup of policies associated with the policy tag 404 may relate to the associated characteristic. The policy cache 400 may associate the policy tag 404 with one or more tag timestamps. The policy cache 400 may associate the policy tag 404 with a critical timestamp (CTS) 406. The CTS 406 may represent the most recent update to a policy associated with the policy tag 404 that requires an update to the client device 106 before the client device 106 is permitted access to the network 102. The policy cache 400 may associate the policy tag 404 with a non-critical timestamp (NTS) 408. The NTS 408 may represent the most recent update to a policy associated with the policy tag 404 that does not require an update to the client device 106 before the client device 106 is permitted access to the network 102. If a certificate of health timestamp 302 predates the CTS 406, the NTS 408 need not be checked for that policy tag 402. Further, the NTS 408 may be updated when the CTS 406 is updated.

Figure 5:
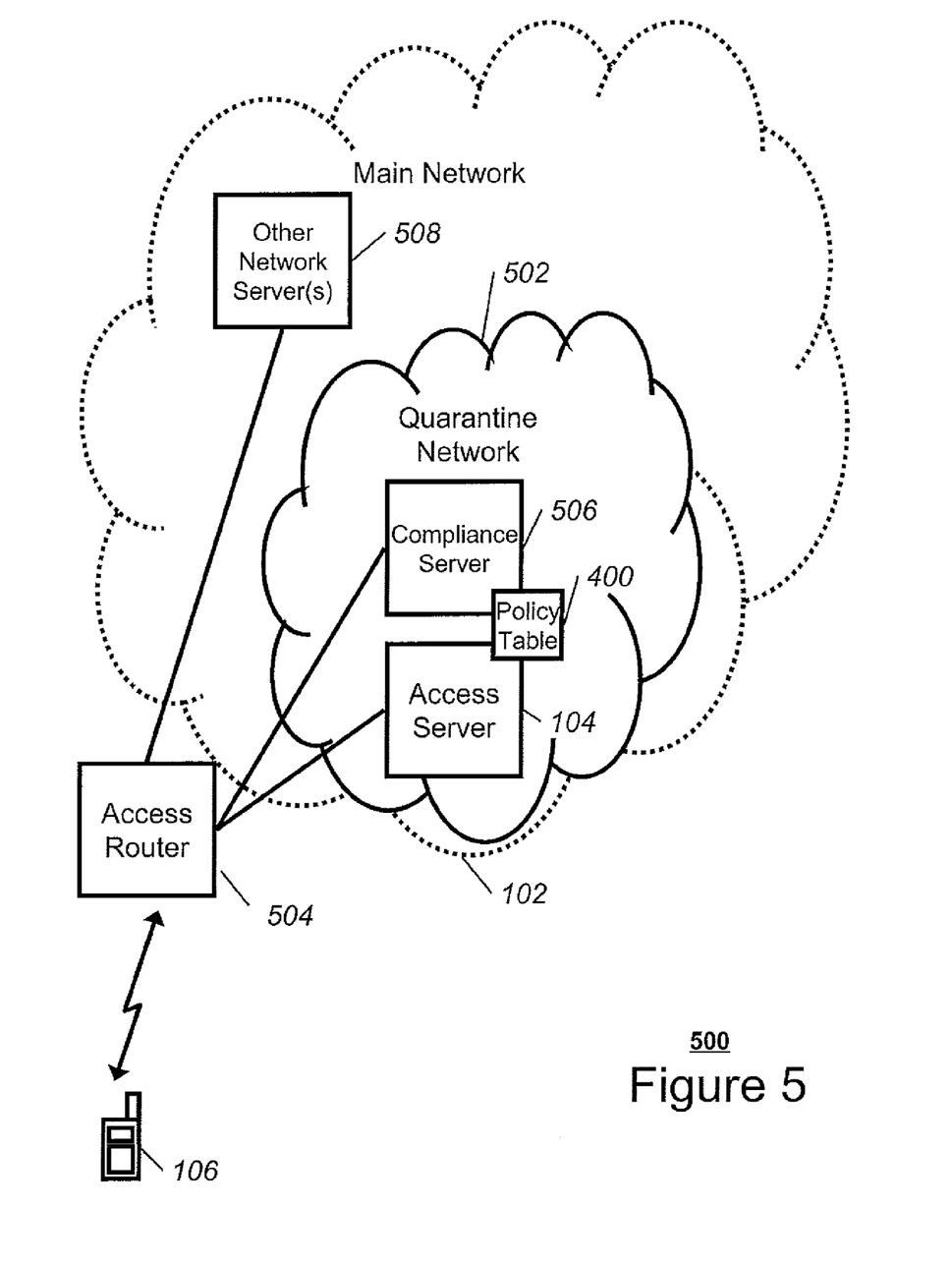
FIG. 5 illustrates one embodiment of a communication system for conforming integrity of the client device.

FIG. 5 illustrates one embodiment of a communication system 500 for conforming integrity of the client device 106. The system may include the network 102, which may include a quarantine network 502; the access server 104; the client device 106; an access router 504; a compliance server 506; and other network servers 508. The access server 104 and compliance server 506 may both have access to a policy table 400. For one embodiment, the access server 104 may be integrated with an authentication server, for example, a remote authentication dial-in user server (RADIUS), a Diameter server, terminal access controller access-control system (TACACS+), or other type of authentication server. The client device 106 may interact with the access router 504 to access the network 102. In one embodiment, the access router 504 may initiate an extensible authentication protocol (EAP) session to begin the process of authentication and verification of compliance to policies of the network 102 by the client device 106. In a preferred embodiment, the access router 504 may initiate EAP through a virtual private network (VPN) gateway, an intranet wired access-point, or an intranet wireless access-point. For example, the EAP exchange may occur over a wireless LAN interface compliant with one of the standards promulgated by the Institute of Electrical and Electronic Engineers (IEEE) known as 802.11. As part of the EAP authentication exchange, the client device 106 may send the client and user authentication information, along with the certificate of health to the intranet wireless access router 504 in a sequence of EAP messages. On receiving each EAP response from the client device 106, the access router 504 may send an access request, such as a RADIUS access request, along with that EAP response to the access server 104. In one embodiment, the access server 104 may authenticate the client device 106. The client device 106 need not be provided access to the network 102 if the authentication fails. The authentication may fail when the access server 104 does not recognize the client device 106. If the authentication succeeds, the authentication server may request the certificate of health by sending an appropriate EAP request, and a subsequent EAP response may contain the certificate of health. The access server 104 may contain a policy table 400 that contains a tag timestamp for each policy tag 304. Upon receipt of the certificate of health, the access server 104 may determine the integrity state of the client device 106 by searching the policy table 400 for entries that match the policy tags 304 listed in the certificate of health 300. If all matching entries have a tag timestamp that predates the certificate timestamp 302, the integrity state of the client device 106 may be deemed current. Based on the integrity state of the certificate of health (current or not current), the client device 106 may be granted access either to the main network 102 or only the quarantine network 502 by the access router 504. The access router 504 may be directed to provide appropriate access to the client device 106 by the access server 104. The access of the client device 106 may thus be restricted to the quarantine network 502, for the purpose of attempting to update the client device 106 and the certificate of health 300, when the certificate of health 300 of the client device 106 is not current. When the certificate of health 300 of the client device 106 is current, the access server 104 may send a success response, such as a RADIUS access-accept response, to the access router 504, with an attribute stating that the client device 106 may be provided access to the main network 102 and the client device 106 may be considered to be operating in the full-access network 512. When the certificate of health 300 of the client device 106 is not current, the access server 104 sends a success response to the access router 504, with an attribute stating that the client device 106 may be provided access only to the quarantine network 502. When restricted to accessing the quarantine network 502, the client device 106 may access only the compliance server 506, whereas when the client is operating in the full-access network 512, the client device may access database server and electronic-mail and other web applications server of the network 102.

When the access server 104 authenticates the client device 106, but the access server 104 determines that the integrity state represented by the certificate of health 300 is not current, a further process may be initiated to verify the integrity state of the client device 106, apply updates to bring it into policy compliance, and update the certificate of health 300. For this process, the client device 106 may be provided access to the quarantine network 502 as stated above. The quarantine network 502 may include a compliance server 506. The compliance server 506 may be used to request and receive integrity measurements from the client device 106 and to verify those measurements against the current policy for that type of device. Further, the compliance server 506 may determine a set of updates that are required to bring the client device 106 back into compliance with policy. Further, the compliance server 506 may be used for updating the certificate of health. The compliance server 506 may construct a new certificate of health 300, which is updated and current. The updated certificate of health 300 may be sent to the client device 106. Further, the client device 106 may use the updated certificate of health for accessing the network 102. For one embodiment, communication with the client device 106 for configuration management and certificate of health provisioning may be realized using a device management protocol, such as open mobile alliance (OMA) device management (DM) protocol, mobility service platform (MSP)®, SOTI®, or others.

Figure 6:
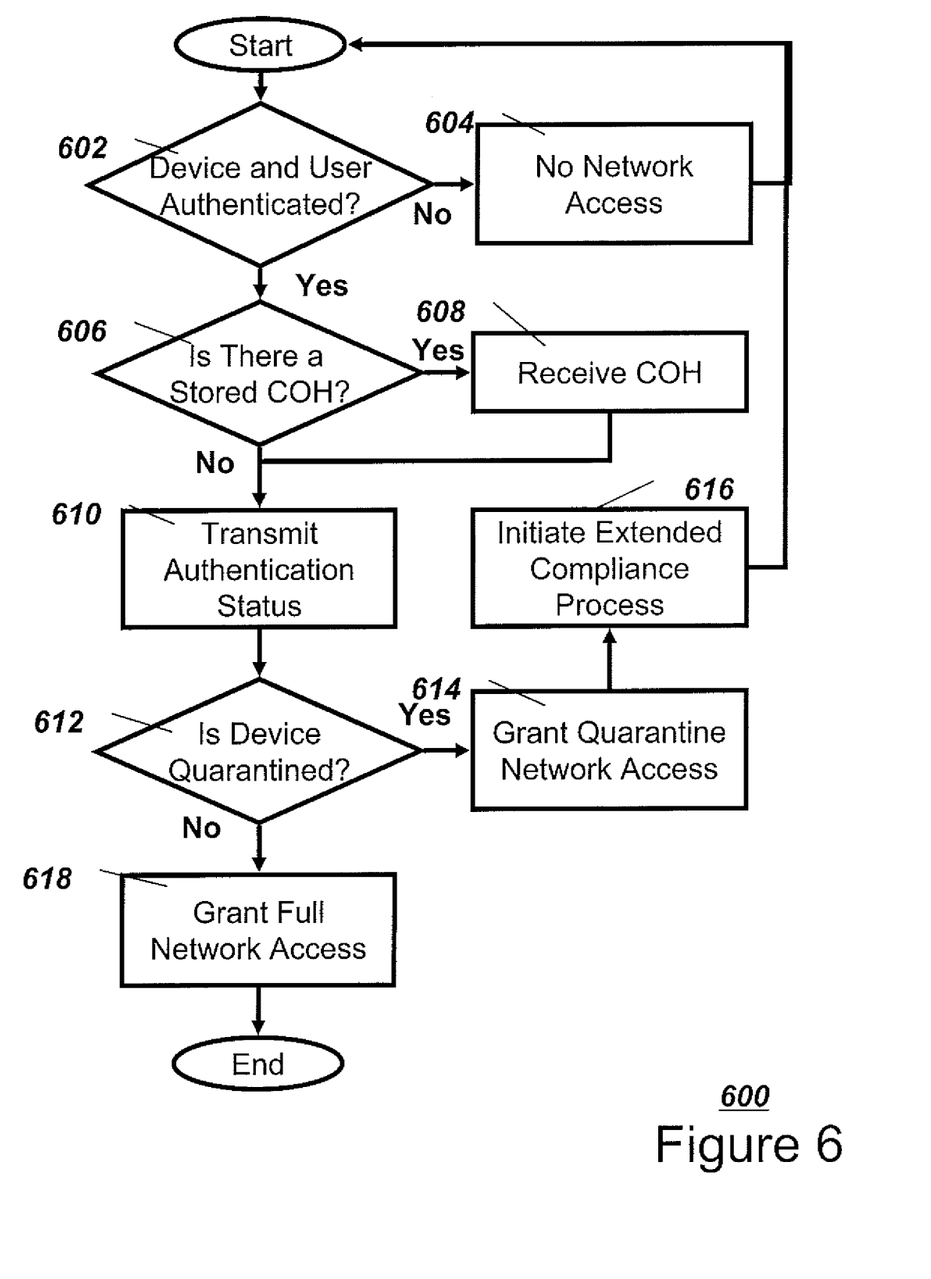
FIG. 6 illustrates in a flowchart one embodiment of a method for an access server to conform integrity of the client device.

FIG. 6 illustrates in a flowchart one embodiment of a method 600 for an access server to conform integrity of the client device 106. The access server 104 may authenticate the device and user (Block 602). In an exemplary implementation, this authentication may occur using an EAP authentication exchange. When authentication fails, the access server 104 may deny network access to the client device 106 (Block 604). The client device 106 may try to authenticate again later. When authentication succeeds, the access server 104 may direct the client device 106 to examine its non-volatile memory 208 to determine if a certificate of health (COH) 300 is stored there (Block 606). If the client device 106 has a COH 300, the access server 104 may receive the COH 300 from the client device 106 (Block 608). In an exemplary implementation, this access server may receive the COH 300 using EAP. The access server 104 may transmit the authentication status to the client device 106 (Block 610). In an exemplary implementation, this authentication status may be represented as an EAP message, such as an EAP-success if full access or quarantine access is granted or an EAP-failure if the authentication fails. The access server 104 may further examine the authentication status to determine whether the device is to be quarantined (Block 612). If the device is to be quarantined, the access server 104 may grant the client device 106 access to the quarantine network 502 (Block 614). The access server may initiate the extended remediation process, as part of a compliance process (Block 616). If the device is not quarantined (Block 612), the access server 104 may grant the client device 106 full access to the network (Block 618).

Figure 7:
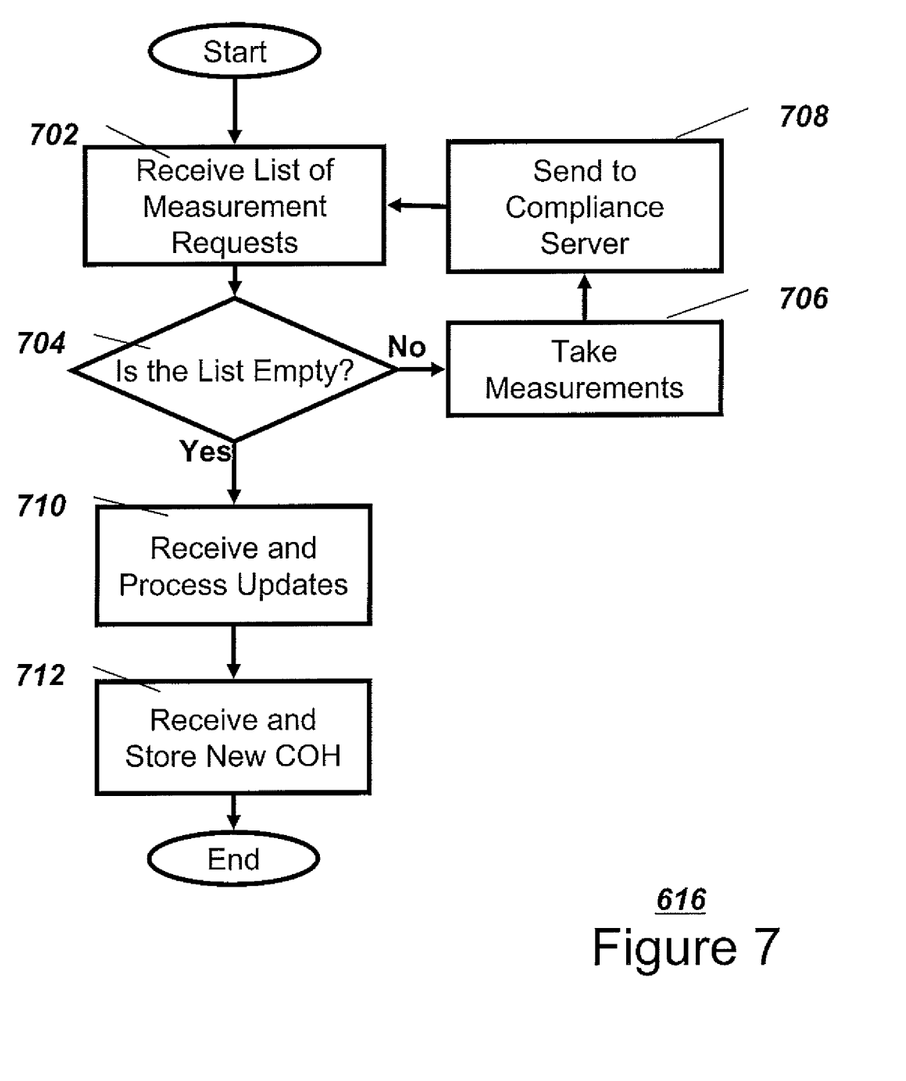
FIG. 7 illustrates in a flowchart one embodiment of a method for a client device to conform its integrity.

FIG. 7 illustrates in a flowchart one embodiment of a method 616 for a client device 106 to conform its integrity. The client device 106 may receive a list of integrity measurement requests from the compliance server 506 (Block 702). The list of integrity measurement requests may include parameters for identifying versions of software, versions of data files, configuration parameters, blowable fuse settings, and other parameters. For one embodiment of the present invention, a device management protocol, such as OMA DM protocol, MSP®, SOTI®, and other device management protocols, may be used to transfer this list of measurement requests from the compliance server 506 to the client device 106. The client device 106 may examine the list of measurement requests to determine whether it is empty (Block 704). If the list of measurement requests is not empty (Block 704), the client device 106 may take at least one of the requested measurements (Block 706) and send them to the compliance server 506 (Block 708). For one embodiment, the device management protocol may be used to transfer the measurements to the compliance server 506. The cycle may repeat until the list of measurement requests from the compliance server 506 is empty. If the list of measurement requests is empty (Block 704), the client device 106 may receive and process a set of updates from the compliance server 506 (Block 710). For example, these updates may include new software packages, new versions of existing software packages, new or updated configuration files or databases (such as a new virus signature database), updated configuration parameters, and other updates. The client device 106 may process these updates as according to their kind (Block 710). For example, new or updated configuration files may be written, and configuration parameters may be altered to new values, respectively. For one embodiment, the device management protocol may be used to transfer the updates to the client device 106 and cause them to be processed. When the updates are complete, the client device 106 may receive and store a new COH 300 from the compliance server 506 (Block 712). This COH 300 may represent the new integrity state of the client device as established by the updates.

Figure 8:
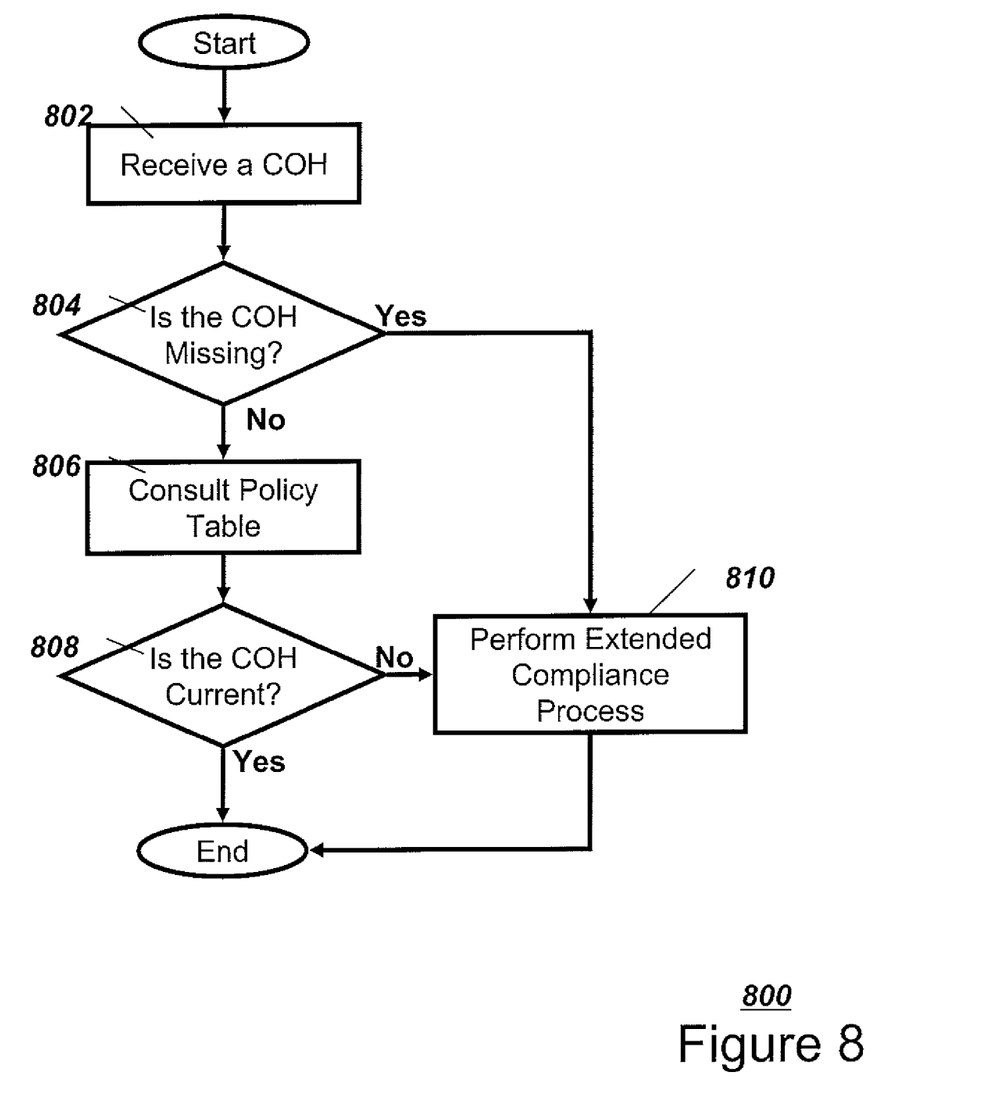
FIG. 8 illustrates in a flowchart one embodiment of a method for an access server to conform integrity of the client device.

FIG. 8 illustrates in a flowchart one embodiment of a method for an access server 104 to conform integrity of the client device 106. The access server 104 may receive a COH 300 from the client device 106 (Block 802). If the client device 106 does not currently possess a COH 300, an indication of a missing COH 300 may be sent. When present, the COH 300 may identify an integrity state of the client device 106. The access server 104 may determine if the COH 300 is present (Block 804). If so, a policy table, such as policy table 400, may be examined to determine whether the COH 300 represents a valid integrity state (i.e., is current), as previously described (Block 806). If, for each of the policy tags 304 in the COH 300, the policy table 400 contains an entry with a timestamp that predates the certificate timestamp 302, then the COH 300 may be deemed current (Block 808). If the COH 300 is current (Block 808), then the integrity of the client device 106 may be confirmed. If the COH 300 is not current (Block 808), the access server 104 may perform an extended remediation process (Block 810).

Figure 9:
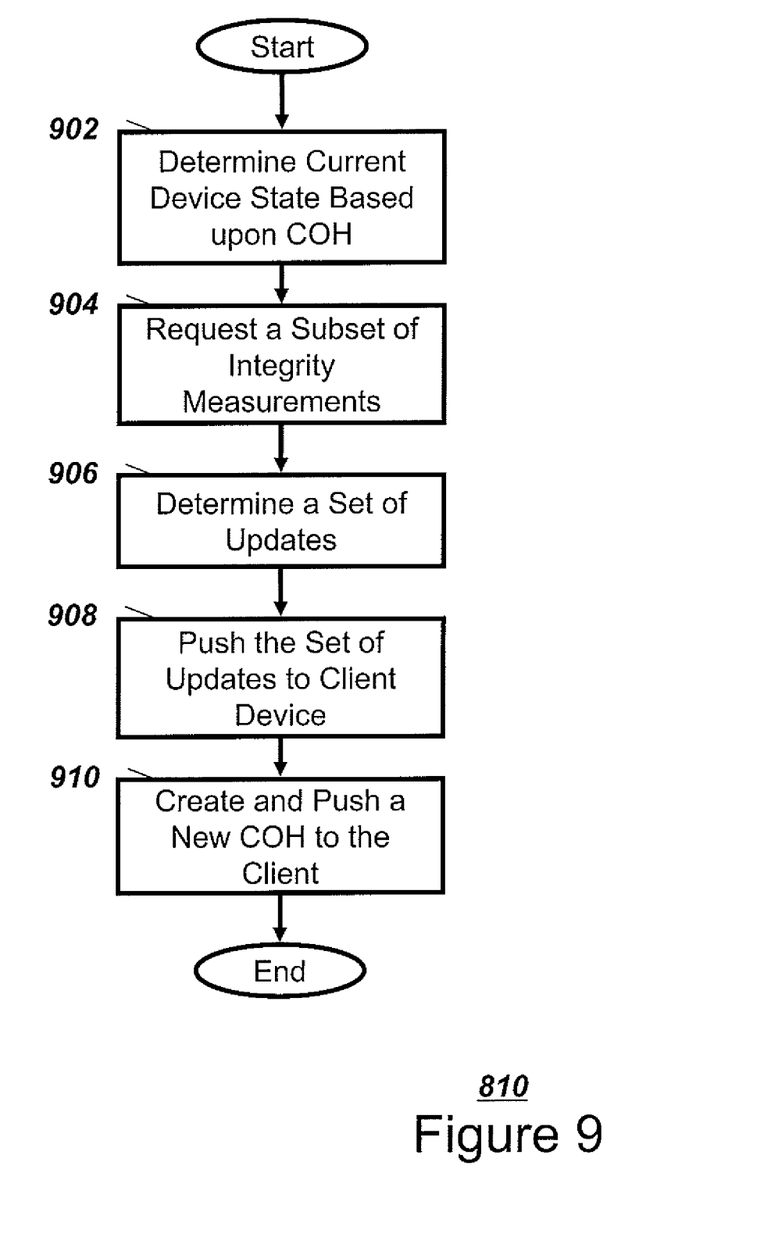
FIG. 9 illustrates in a flowchart one embodiment of a method for a compliance server to conform integrity of the client device.

FIG. 9 illustrates in a flowchart one embodiment of a method 810 for an extended remediation process for a compliance server 506 to conform integrity of the client device 106. The compliance server 506 may examine the COH 300 to determine the current integrity state of the client device 106 (Block 902). The integrity state may include a policy that represents a set of integrity measurements. The set of integrity measurements may include parameters for identifying versions of software, versions of data files, configuration parameters, blowable fuse settings, and parameters. Because the COH 300 does not represent a current integrity state, a subset of the integrity measurements represented by the COH 300 may be no longer current. The compliance server 506 may determine the subset of integrity measurements that is not current by comparing the set of integrity measurements represented by the policy tags 304 with the current set of integrity measurements for the predefined class of client devices. The compliance server 506 may request the set of integrity measurements that are not current from the client device 106 (Block 904). For one embodiment of the present invention, a device management protocol may be used for requesting the client device 106 for a subset of integrity measurements that are not current. The device management protocol may be OMA DM protocol, MSP®, SOTI®, or other device management protocols. The compliance server 506 may determine a set of updates (Block 906). The set of updates may be determined from the subset of integrity measurements. The compliance server 506 may push the set of updates to the client device (Block 908). The set of updates may be an updating of the version of software and data files stored on the client device 106, configuration parameters, and blowable fuse settings. For one embodiment of the present invention, a device management protocol may be used to push the updates. The compliance server 506 may create a new COH 300 representing the new integrity state of the client device 106 and push the new COH to the client device 106 (Block 910). Upon completion of this remediation process, the client device 106 may be granted full access to the main network 102.

The method and system described herein may be used for conforming integrity of lightweight client devices, such as, mobile phones and other handheld devices. A preferred embodiment of the present invention may use the framework defined by the extensible authentication protocol and IEEE 802.1x. Further, the present invention may shift the majority of processor intensive task from the client device to a fixed-end server. The client device may need to store only a COH created by the server. Further, the integrity of the COH may be protected using binding techniques, such as signed cryptographic hashes. The creation of a valid COH may be limited to the server in possession of the private key. Because the COH may contain a client device identifier 306, a valid COH on one device may not be transferable to another.

Figure 10:
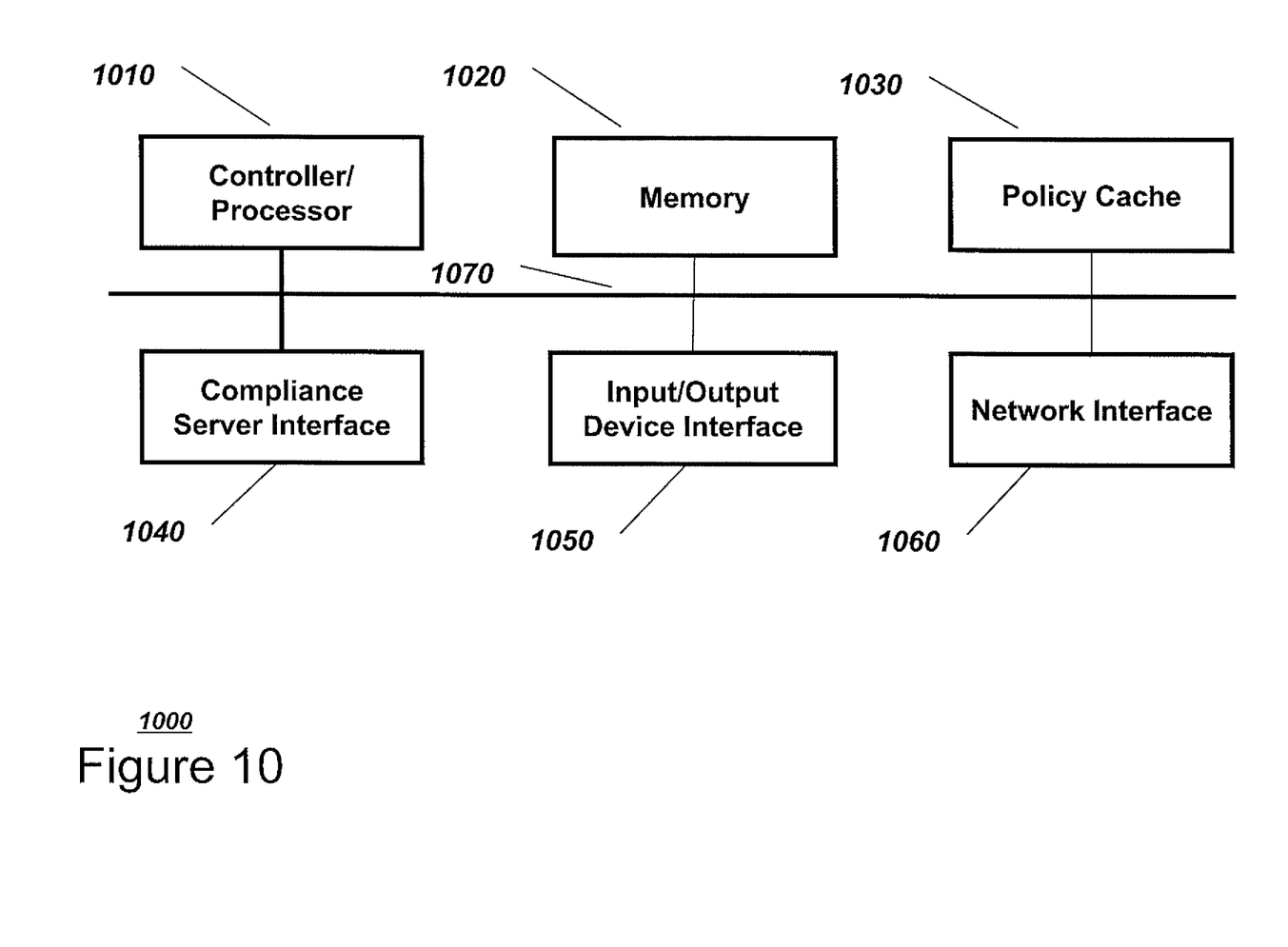
FIG. 10 illustrates a possible configuration of a computing system to act as a server to execute the present invention.

FIG. 10 illustrates a possible configuration of a computing system 1000 to act as a server to execute the present invention. The computer system 1000 may include a controller/processor 1010, a memory 1020, a policy cache 1030 (described above as policy cache 400), a compliance server interface 1040, input/output device interface 1050, and a network interface 1060, connected through bus 1070. The computer system 1000 may implement any operating system, such as Microsoft Windows®, UNIX, or LINUX, for example. Client and server software may be written in any programming language, such as C, C++, Java or Visual Basic, for example. The server software may run on an application framework, such as, for example, a Java® server or .NET® framework The controller/processor 1010 may be any programmed processor known to one of skill in the art. However, the decision support method can also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein can be used to implement the decision support system functions of this invention.

The memory 1020 may include volatile and nonvolatile data storage, including one or more electrical, magnetic or optical memories such as a random access memory (RAM), cache, hard drive, or other memory device. The memory may have a cache to speed access to specific data. The memory 1020 may also be connected to a compact disc-read only memory (CD-ROM), digital video disc-read only memory (DVD-ROM), DVD read write input, tape drive or other removable memory device that allows media content to be directly uploaded into the system.

The Input/Output interface 1050 may be connected to one or more input devices that may include a keyboard, mouse, pen-operated touch screen or monitor, voice-recognition device, or any other device that accepts input. The Input/Output interface 1050 may also be connected to one or more output devices, such as a monitor, printer, disk drive, speakers, or any other device provided to output data.

The network interface 1060 may be connected to a communication device, modem, network interface card, a transceiver, or any other device capable of transmitting and receiving signals over a network. The network interface 1060 may be used to connect a client device to a network or a quarantine network. The compliance server interface 1040 may be implemented as software on top of the network interface 1060 to interact with the compliance server 506. The components of the computer system 1000 may be connected via an electrical bus 1070, for example, or linked wirelessly.

Client software and databases may be accessed by the controller/processor 1010 from memory 1020, and may include, for example, database applications, word processing applications, as well as components that embody the decision support functionality of the present invention. The computer system 1000 may implement any operating system, such as Microsoft Windows®, LINUX, or UNIX, for example. Client and server software may be written in any programming language, such as C, C++, Java or Visual Basic, for example.

The access server 504 may gather policies into a sub-group of the overall group of the policies stored in the policy cache and associate the sub-group with a policy tag 404. The tag may be used to make a quicker determination as to which policies are out of date. The certificate of health 300 may include a list of all policy tags 304 that may be associated with the client device 106. The policy tags 304 may also include a combo-tag, representing a group of tags. The combo-tags may be considered a subset of the policy tags 304. Each policy tag or combo tag may be associated with a tag timestamp or combo tag time stamp, representing the last time a policy associated with that tag or combo tag has been updated. Further, the policy cache 400 may organize these policies in an order to facilitate searching based upon these tags.

Figure 11:
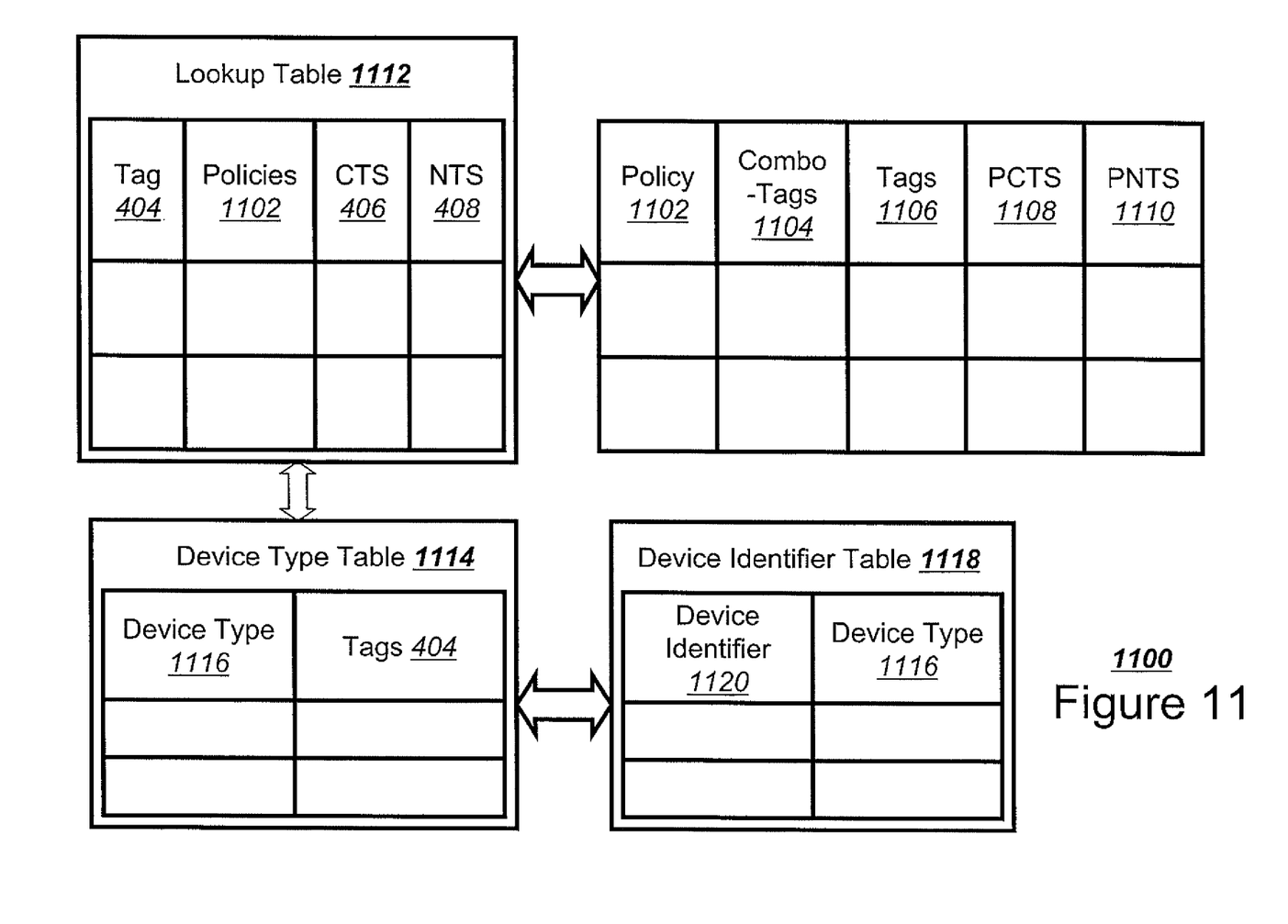
FIG. 11 illustrates in a block diagram one embodiment of a policy database that may be stored in a compliance server.

FIG. 11 illustrates in a block diagram one embodiment of a policy database 1100 that may be stored in a compliance server 506. The policy database 1100 may store a group of policies 1102 for a network 102. The policy database 1100 may be used to set up the policy cache 400. Each policy 1102 may be associated with a set of combo-tags 1104 and policy tags 1106. Each policy 1102 may be associated with multiple combo-tags 1106 or policy tags 1106. Each policy tag 1106 may represent a specific characteristic of a client device 106. Each combo-tag 1104 may represent a combination of specific characteristics for a client device 106. For example, a first policy tag 1106 may be for a given network provider and a second policy tag 1106 may be for a given device manufacturer. A combo-tag may exist for a client device 106 that has both that network provider and device manufacturer.

The policy database 1100 may associate the policy 1102 with a policy critical timestamp (PCTS) 1108. The PCTS 1108 may represent the most recent update to a policy that requires an update to the client device 106 before the client device 106 is permitted access to the network 102. The policy database 1100 may associate the policy 1102 with a policy non-critical timestamp (PNTS) 1110. The PNTS 1110 may represent the most recent update to a policy that does not require an update to the client device 106 before the client device 106 is permitted access to the network 102.

The policy database 1100 may be associative, so that a policy 1102 may be looked up by policy 1102 or by policy tag 1106. A lookup table 1112 may be used to organize items by policy tag 404. The lookup table 1112 may connect each policy tag 404 with every policy 1102 associated with that policy tag 404. The lookup table 1112 may associate each policy tag 404 with the most recent PCTS 1108 and the PNTS 1110, storing each as the CTS 406 and the NTS 408.

The policy database 1100 may maintain a device type table 1114 to associate a device type 1116, representing a group of similar devices, with a set of policy tags 404 that constitute the complete set of policies for that device type. This set of policy tags 404 may be stored in a priority order to specify the policy tag 404 that controls if the policies designated by these tags ever conflict. The policy database 1100 may further maintain a device identifier table 1118 storing each unique device identifier 1120 of a client device 106 associated with the network 102. The device identifier table 1118 may associate each device identifier 1120 with a device type 1116. An access server 104 may use the device identifier table 1118 and the device type table 1114 when interacting with a client device 106 seeking to access the network 102 that lacks the COH 300. The access server 104 may use the unique device identifier 1120 of the client device 106 to determine the necessary set of policies 1102 and thus the set of policy tags 304 to be included in a COH 300. Alternative to the device identifier table 1118, each client device 106 may store a device type 1114 and present the device type 1114 to the access server 104 upon the first access attempt.

Figure 12:
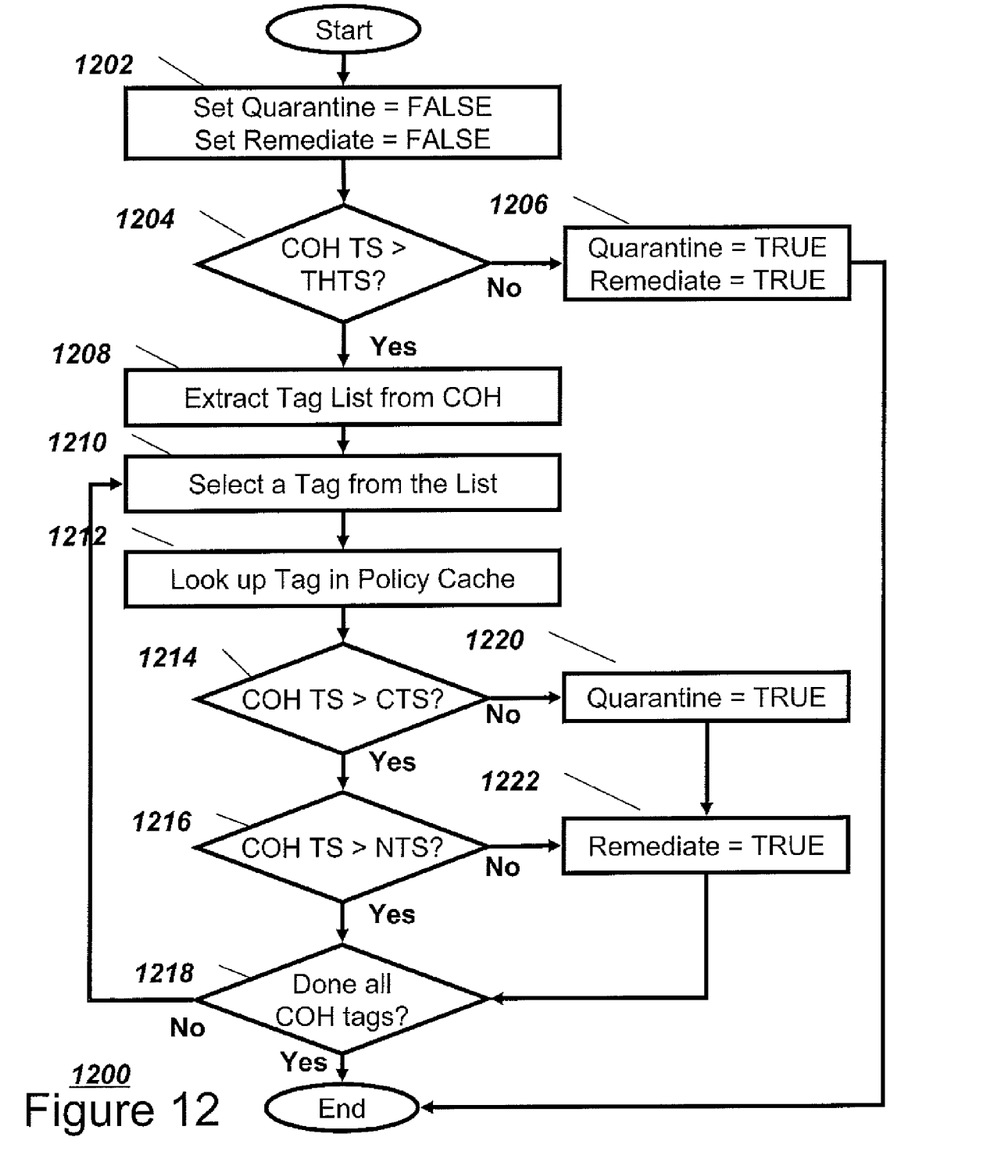
FIG. 12 illustrates in a flowchart one embodiment of a method of granting access to the network based on a comparison of the tags.

FIG. 12 illustrates in a flowchart one embodiment of a method 1200 of granting access to the network 102 based on a comparison of a tag timestamp with a COH timestamp (COH TS) 302. The access server 104 may use a "Quarantine" flag and a "Remediate" flag to indicate actions to be taken with a client device 106 seeking to access a network 102. The access server 104 may set the "Quarantine" flag and the "Remediate" flag to "FALSE", indicating these actions are not to be taken (Block 1202). If the COH TS 302 does not postdate the THTS 402 (Block 1204), the access server 104 may set the "Quarantine" flag and the "Remediate" flag to "TRUE", indicating these actions are to be taken (Block 1206). If the COH TS 302 postdates the THTS 402 (Block 1204), the access server 104 may extract a policy tag list 304 from the COH 300 (Block 1208). The access server 104 may select a policy tag 304 from the list (Block 1210). The access server 104 may also derive a combo-tag representing a grouping of policy tags in the list 304. The access server 104 may look up the policy tag 304 in the policy cache 400 (Block 1212). If the COH TS 302 postdates the CTS 406 (Block 1214) and the NTS 408 (Block 1216) and not all the policy tags 304 have been looked up (Block 1218), the access server 104 select a new policy tag 304 from the list (Block 1210). If the COH TS 302 does not postdate the CTS 406 (Block 1214), the access server 104 may set the "Quarantine" flag to "TRUE" (Block 1220). If the COH TS 302 does not postdate the CTS 406 (Block 1214) or the NTS 408 (Block 1216), the access server 104 may set the "Remediate" flag to "TRUE" (Block 1222).

Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination thereof) through a communications network.

Embodiments within the scope of the present invention may also include computer-readable media for carrying or having computer-executable instructions or data structures stored thereon. Such computer-readable media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which may be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

By gathering a sub-group of the group of policies and associating the sub-group with a policy tag, the access server may validate the certificate of health quickly, minimizing the delays during network access. Further, the access server may minimize memory required to store the combinations of groups and their timestamps. The access server may also improve scalability of the policy management system.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method for conforming integrity of a client device, comprising:
  receiving a certificate of health from the client device;
  extracting from the certificate of health a certificate timestamp and a policy tag associated with a subgroup of a group of policies;
  storing multiple policy tags in a priority order;
  accessing a tag timestamp associated with the policy tag;
  executing a comparison of the certificate timestamp with the tag timestamp; and
  granting access to a network based in part upon the comparison.

2. The method of claim 1, further comprising:
  granting access to a quarantine network if the certificate timestamp predates the tag timestamp and the tag timestamp is a critical timestamp.

3. The method of claim 1, further comprising:
  instructing the client device to perform a detailed remediation process if the certificate timestamp predates the tag timestamp.

4. The method of claim 3, further comprising:
  granting access to the network if the certificate timestamp predates the tag timestamp, the tag timestamp is a non-critical timestamp, and the certificate of health has no policy tags with a critical timestamp that postdates the certificate timestamp.

5. The method of claim 1, further comprising:
  accessing a threshold timestamp associated with the group of policies; and
  granting access to a quarantine network if the certificate timestamp predates the threshold timestamp.

6. The method of claim 1, further comprising:
  associating a policy timestamp with a policy of the group of policies.

7. The method of claim 1, wherein the policy tag is a combo tag associated with a set of policy tags.

8. An access server for conforming integrity of a client device, comprising:
  a memory that stores a policy tag associated with a subgroup of a group of policies and a tag timestamp, wherein the memory stores multiple policy tags in a priority order;
  a processor that extracts from a certificate of health a certificate timestamp and the policy tag, accesses the tag timestamp, and executes a comparison of the certificate timestamp with the tag timestamp; and
  a network interface that receives the certificate of health from the client device and grants access to a network based in part upon the comparison.

9. The access server of claim 8, wherein the network interface grants access to a quarantine network if the certificate timestamp predates the tag timestamp and the tag timestamp is a critical timestamp.

10. The access server of claim 8, wherein the network interface instructs the client device to perform a detailed remediation process if the certificate timestamp predates the tag timestamp.

11. The access server of claim 10, wherein the network interface grants access to the network if the certificate timestamp predates the tag timestamp, the tag timestamp is a non-critical timestamp, and the certificate of health has no policy tags with a critical timestamp that postdates the certificate timestamp.

12. The access server of claim 8, wherein the processor accesses a threshold timestamp associated with the group of policies and grants access to a quarantine network if the certificate timestamp predates the threshold timestamp.

13. The access server of claim 8, wherein the memory associates a policy timestamp with a policy of the group of policies.

14. The access server of claim 8, wherein the policy tag is a combo tag associated with a set of policy tags.

15. A system comprising:
  a client device to securely access a network, comprising:
    a memory that stores a certificate of health containing a policy tag associated with a subgroup of a group of policies and a certificate timestamp; and
    a transceiver that transmits the certificate of health to the network and accesses the network based in part upon a comparison of a tag timestamp associated with the policy tag and the certificate timestamp; and
  an access server comprising:
    a memory that stores multiple policy tags in a priority order.

16. The system of claim 15, wherein the client device further-comprises:
  a processor that performs a detailed remediation process if the certificate timestamp predates the tag timestamp.

17. The system of claim 15, wherein the client device further-comprises:
  a processor that performs a detailed remediation process after the client device accesses a quarantine network if the certificate timestamp predates the tag timestamp and the tag timestamp is a critical timestamp.

18. The system of claim 15, wherein the transceiver accesses a quarantine network if a threshold timestamp associated with the group of policies predates the certificate timestamp.

19. The system of claim 15, wherein the policy tag is a combo tag associated with a set of policy tags.

* * * * *